Oct. 15, 1957

L. D. ETHINGTON ET AL 2,809,532

HYDRAULIC STEERING MECHANISM

Filed Dec. 1, 1953

INVENTORS
L. D. ETHINGTON, W. W. DONAHUE,
G. V. DOW & R. GIERTZ
BY

ATTORNEYS

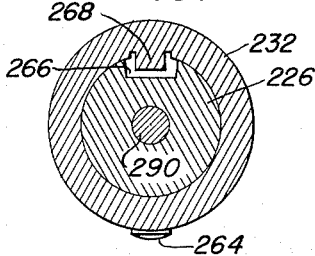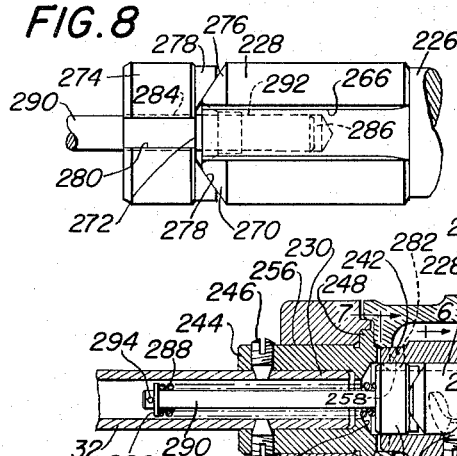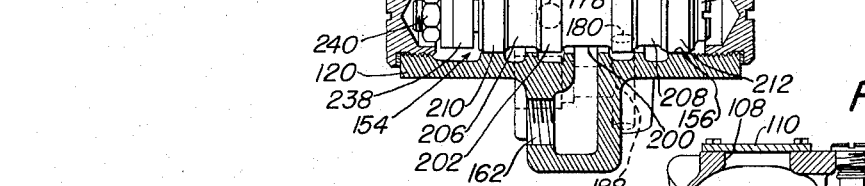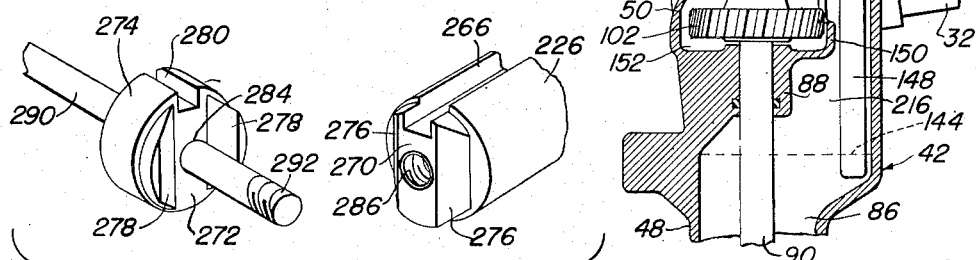

United States Patent Office 2,809,532
Patented Oct. 15, 1957

2,809,532

HYDRAULIC STEERING MECHANISM

Lloyd D. Ethington, Cedar Falls, Walter W. Donahue, Waterloo, George V. Dow, Cedar Falls, and Robert W. Giertz, Waterloo, Iowa, assignors to Deere Manufacturing Co., Dubuque, Iowa, a corporation of Iowa Application December 1, 1953, Serial No. 395,520

14 Claims. (Cl. 74—388)

This invention relates to hydraulic steering mechanism for vehicles and more particularly to such mechanism as applied to agricultural tractors.

The invention contemplates and has for a principal object the provision of an improved hydraulic system, improved supporting structure for the various components of the mechanism and novel and improved control means for the system. As applied specifically to an agricultural tractor of the tricycle type, the invention contemplates improved design involving the use at the front end of the tractor of an upright tubular support or pedestal which serves not only to journal the upright steering spindle but also to house a hydraulic motor as well as including a portion serving as an integral fluid reservoir. In this respect, it is an important object to provide the pedestal in the form of a multi-section support in which the various sections are arranged in stacked relationship, a lower section serving to journal the lower portion of the steering spindle, an intermediate section serving as a housing or chamber for a motor of the vane type, a section next above serving as a fluid reservoir and a top section enclosing not only mechanical steering means but also serving as a support for the improved valve mechanism.

The particular arrangement disclosed is of the type in which hydraulic steering means operates in parallel with mechanical means and it is therefore an object of the invention to combine the two so that basic tractor design is retained as far as possible and the hydraulic system is superimposed to establish an efficient and compact organization. It is a further object to incorporate in the dual system means for assuring operation of the steering mechanism by the mechanical means in the event of failure of the hydraulic system.

As respects the control means, it is an important feature of the invention to provide control valve actuating means sensitive to the operator but one that will not transmit road shocks to the valve, thus avoiding fluctutions in the valve which would otherwise impose on the operator the burden of exercising more skill than would be necessary in a straight mechanical steering system. The design features in the control mechanism include means for affording the operator a desirable "feel," by means imposing a slight resistance to turning of the steering wheel so that the operator can ascertain the amount that the steering wheel must be turned. It is a further characteristic of the control system that it includes follow-up means for immediately returning the control valve to neutral after the steerable wheels have been turned to the desired extent. Underlying the entire design is the incorporation of features that contribute materially to simplicity of construction, ease and economy of maintenance and low initial cost.

The foregoing and other important objects inherent in and encompassed by the invention will become apparent as a detailed disclosure of a preferred embodiment of the invention progresses.

In the drawings:

Fig. 4 is a fragmentary section, on a scale enlarged over that of Figs. 2 and 3, showing the control mechanism as seen generally along the line 4—4 of Fig. 2.

Fig. 5 is a fragmentary sectional view of the upper portion of the support or pedestal as seen generally along the line 5—5 of Fig. 2.

Fig. 6 is a transverse section, on an enlarged scale, as seen along the line 6—6 of Fig. 4.

Fig. 8 is a fragmentary top plan view of the ramp or cam means in the control mechanism, the figure being drawn to a scale enlarged over that of Fig. 4.

Fig. 9 is an exploded view showing the cooperative cam elements of the structure of Fig. 8.

Fig. 10 is a schematic view illustrating the hydraulic system.

In General

Figure 1:
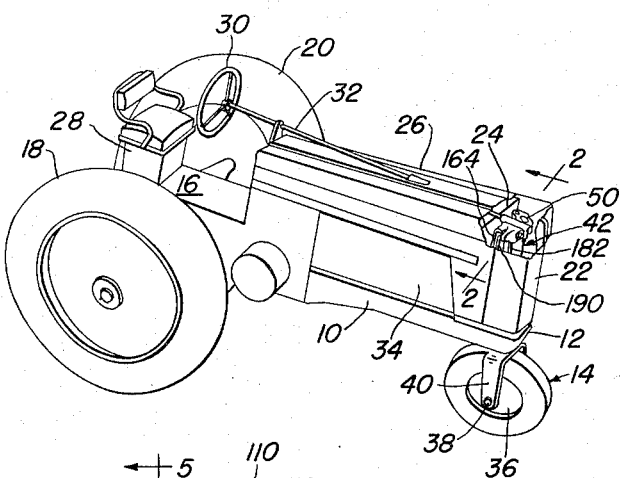
Fig. 1 is a perspective view of a representative tractor, portions of the upper front part thereof being broken away to expose the general position of the steering mechanism.

The tractor chosen for the purposes of illustration, and shown particularly in Fig. 1, is somewhat representative of the conventional agricultural tractor and comprises a longitudinal main body 10 having a front body portion 12 supported on steerable wheel means 14 and a rear body portion 16 carried in the usual fashion on a transverse axle including widely spaced, relatively large traction wheels 18 and 20. The forward body portion 12 has an upright grille or radiator enclosure 22 behind which is located a conventional radiator 24, this radiator being arranged ahead of the usual internal combustion engine (not shown) over which lies a rearwardly extending hood and fuel tank arrangement 26. An operator's seat 28 is carried at the rear body portion 16 of the tractor and ahead of the seat is a steering wheel 30 connected in not unconventional manner to a forwardly extending steering shaft 32. The sides of the hood 26 may be enclosed by side sheets 34, which therefore conceal the usual tractor engine. The steerable front wheel means 14 is of the single wheel type in which a relatively small wheel 36 is journaled on a transverse axle 38 carried by a steering fork 40. However, a truck of the dual wheel type could as well replace the single wheel means 14.

The grille 22 has been broken away in Fig. 1 to illustrate the upper portion of a tubular support or pedestal, designated generally by the numeral 42. Within this upper portion is mechanical steering gear means, to be described later, connected to the forward end portion of the steering shaft 32. Apart from the hydraulic steering mechanism and the refinements of the mechanical system because of the superimposition of the hydraulic system, the tractor is steered in conventional manner.

Supporting structure

The pedestal, heretofore designated generally by the numeral 42, is arranged in upright fashion at the forward end of the tractor and comprises a plurality of sections; namely, a lower section 44, an intermediate section 46 and an upper section 48, the latter being relatively elongated so as to have a top housing portion 50 generally at the level of the forward end of the steering shaft 32.

The forward body portion 12 has an upstanding annular supporting portion or integral sleeve 52 that receives the lower support section 44. The section 44 is itself in the form of a sleeve or tubular portion having at its lower end an antifriction bearing 54 and at its upper end an upper horizontal, generally circular wall 56 which is apertured at 58 coaxially with the bearing 54. The circular wall 56 is bordered by an annular flange 60 in which is provided a series of circumferentially spaced tapped bores 62 preferably alternated with a series of unthreaded vertical openings 64. The upright tubular portion 52 of the body portion 12 has a series of tapped bores used in mounting the tubular support or pedestal 42 on the body. Only one of these bores is shown at 66 in Fig. 2, but it will be understood that several of such bores are present and are circumferentially spaced. The illustration of one will suffice for present purposes.

The intermediate support section 46 is of generally cylindrical construction about a vertical axis and defines an interior chamber 68 having an internal cylindrical wall 70. The exterior of the section 46 has a series of vertical bolt-receiving apertures 72 respectively in alinement with the apertures or openings 62 and 64 previously described.

The lower portion of the upper section 48 is in the form of a circular horizontal wall 74 centrally apertured at 76 in axial alinement with the aperture 58 in the upper wall 56 of the lower section 44 and bordered by an annular flange 78 in which is provided a series of circumferentially spaced bolt-receiving openings 80.

The intermediate section 46 is sandwiched between the walls 56 and 74 of the lower and upper sections 44 and 48 with the bolt-receiving apertures and openings respectively in vertical alinement. Cap screws 82 and 84 are used to rigidly interconnect the sections 44, 46 and 48 and to rigidly mount the entire tubular supporting structure 42 on the front body portion 12 of the tractor. The cap screws 82 pass through the flange 78, through the annular wall of the section 46 and are threaded at their lower ends into the tapped bores 62 in the flange 60 of the lower section 44. The cap screws 84 pass completely through the flanges and walls just described and are threaded into the tapped bores 66 in the upstanding portion 52 of the front body part 12.

The walls 56 and 74 of the sections 44 and 48 respectively define the bottom and top walls of the cylindrical chamber 68, which will be hereinafter referred to as a motor chamber. This chamber is, in substance, formed from an enlargement of the tubular support 42.

Above the top wall 74 of the motor chamber 68, the upper section 48 of the tubular support 42 is hollow to provide a fluid reservoir 86. An upper portion of the section 48 is of reduced dimension to establish a bearing 88 coaxial with the wall openings 58 and 76 and the lower antifriction bearing 54. A steering spindle 90 extends axially through the tubular support 42, being journaled adjacent its upper end in the bearing 88 and being journaled at its lower end in the antifriction bearing 54. The lowermost end of the spindle 90 is flanged at 92 and includes a coaxial pilot 94 for centering in the top portion of the steerable wheel fork 40. Any appropriate means may be utilized for rigidly securing the fork to the flange 92 so that the spindle and fork turn in unison about the major axis of the spindle. The reservoir 86 is sealed off from the motor chamber 68 by any appropriate seal means, here shown as an annular fluid seal 96 encircling that portion of the spindle that passes through the wall 74. A similar seal 98 encircles that portion of the spindle 90 that passes through the lower wall 56 and seals the motor chamber 68 against leakage. A lubricant seal 100 may be used in conjunction with the lower bearing 54.

The upper portion 50 of the upper section 48 effects an enclosure for a gear element or worm wheel 102 forming part of mechanical steering gear means designated generally by the numeral 104. The worm wheel 102 is keyed to the upper end of the spindle 90 above the bearing 88 and is in constant mesh with another gear element in the form of a worm 106 connected, in a manner to be described later, to the forward portion of the steering shaft 32, from which it will be seen that rotation of the steering wheel 30 and steering shaft 32 imparts rotation to the worm 102 and thus turns the spindle 90 to steer the steerable wheel means 14. The worm wheel housing afforded by the portion 50 is formed at its top with an access opening 108 normally closed by a removable cover 110. The worm wheel housing 50 has at one side thereof a side opening 112 through which the worm wheel 102 is exposed to achieve its constant mesh with the worm 106. A worm housing 114 is rigidly but removably secured to the worm wheel housing 50 and itself has an inner side opening 116 registering with the worm wheel housing opening 112. The worm housing 114 further has at its opposite side an outer side opening 118 normally closed by a removably mounted valve housing 120. Since this housing forms part of the hydraulic system, it will be described below.

*Hydraulic system*

As has been seen, the steerable front wheel means 14 may be mechanically steered by the steering wheel 30 and steering shaft 32 through the medium of the mechanical steering gear means 104 and spindle 99. The hydraulic system operates in parallel with the mechanical system and preferably utilizes a hydraulic motor in the motor chamber 68 to turn the spindle 90 by power.

Figure 2:
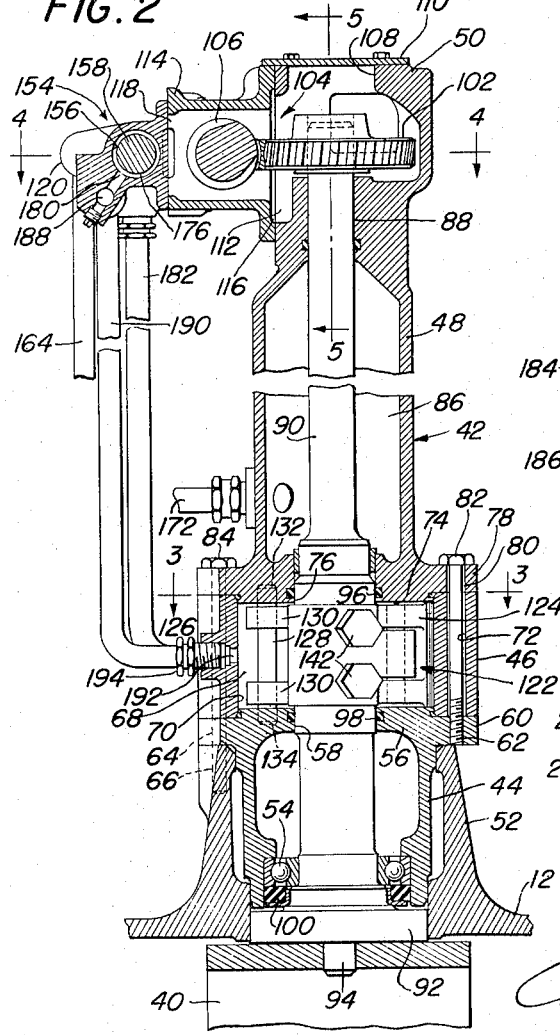
Fig. 2 is a transverse sectional view, on an enlarged scale, as would be seen were the front portion of the tractor cut by a transverse upright plane including the line 2—2 of Fig. 1.

The motor, designated generally by the numeral 122, is of the vane type having a movable vane 124 secured to the spindle 90 and a fixed vane 126 secured to the support 42. The mounting of the fixed vane 126 is accomplished by a pin 128 passing vertically through ears 130 attached to the vane, upper and lower portions of the pin being anchored or received in the upper and lower motor chamber walls 74 and 56, as at 132 and 134 respectively (Fig. 2). The movable vane 124 is similar to the fixed vane 126 and to that extent has a pair of integral ears 136 pinned by a vertical pin 138 to a casting 140 secured to the chamber-housed portion of the spindle 90 by means of a pair of cap screws 142. The pivotal mounting of the vanes 124 and 126 respectively at 138 and 128 enables the vanes to accommodate themselves to slight irregularities in the motor chamber and the efficiency of the motor is thereby increased. Since the recesses or pockets 132 and 134 respectively in the motor chamber upper and lower walls 74 and 56 do not pass all the way through these walls, there is no problem of leakage in the supporting of the fixed vane pin 128.

Fluid is maintained in the reservoir 86 substantially at the level indicated by the numeral 144 in Fig. 5, and the top wall of the worm wheel housing 50 has, laterally offset from the axis of the spindle 90, a threaded aperture 146 into which is threaded the upper end of a removable ullage rod 148 (Fig. 5). As also shown in Fig. 5, the portion of the tubular support 42 in which the bearing 88 is formed includes an internal marginal wall 150 that defines a lubricant-retaining pocket 152 in which hydraulic fluid—which is also used for lubrication—is trapped in quantities sufficient to insure adequate lubrication of the steering gear means 104. As will be brought out below, the circulation of the fluid is such that it passes the steering gear means 104 on its return to the reservoir 86.

As described above, the upper portion of the tubular support 42 provides for the mounting of the valve housing 120. This housing contains valve means, designated generally by the numeral 154, comprising a valve bore 156 and an axially shiftable valve member 158 of the multi-spool type.

The valve housing 120 has, substantially coaxial with the main valve bore 156, a central inlet or high-pressure annulus or chamber 160 to which fluid under pressure is supplied through a threaded inlet 162. A high-pressure line 164 (Fig. 10) is connected at one end to the housing 120 via the threaded inlet 162 and is connected at its other end to the discharge side of a pump 166 of the constant displacement type. This pump is shown schematically in Fig. 10 as being driven by a shaft 168 which in the present case is the tractor-engine-driven fan shaft, a representative engine fan 170 being shown for illustrative purposes. The inlet or low side of the pump 166 is connected by a suction line 172 to the reservoir 86 in the pedestal or tubular support 42.

Axially spaced at opposite sides of the high-pressure chamber 160 are internal annular grooves 174 and 176 and these lead respectively to motor ports 178 and 180.

Figure 3:
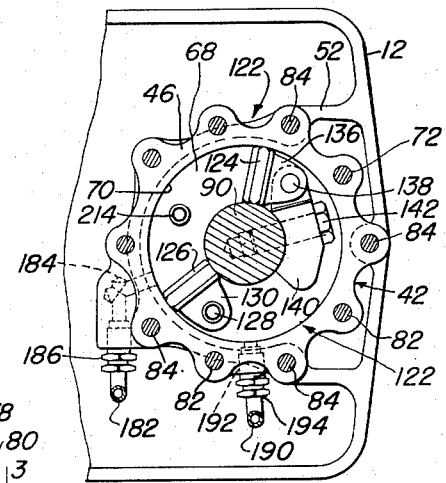
Fig. 3 is a transverse section as seen substantially along the line 3—3 of Fig. 2.

As will appear below, fluid transmitted through the motor port 178 is effective to cause the tractor to steer to the right; hence, this port will hereinafter sometimes be referred to as a right-turn motor port. For the same reason, reference will be had to the port 180 as a left-turn motor port. The right-turn motor port 178 communicates through appropriate passages (not shown) in the valve housing 120 and via a downwardly extending fluid line 182 to a motor inlet 184 leading into the motor chamber 68 at the left-hand side of the fixed motor vane 126 (Fig. 3). Any suitable fitting, such as that shown at 186, may be used to connect the line 182 to the motor section 46 for communication with the motor inlet 184. The left-turn motor port 180 communicates via a valve housing passage 188 with a second downwardly extending motor line or fluid conduit 190 to the motor chamber 68 via a motor inlet 192 to the right of the fixed motor vane 126. An appropriate fitting, such as shown at 194, establishes connection of the motor line 190 to the motor section 46.

In addition to the high-pressure or inlet chamber 160 and the right-turn and left-turn motor ports 178 and 180, the valve bore or chamber 156 includes a pair of reservoir ports or passages 196 and 198, these being spaced axially respectively at opposite sides of the central group 160—178—180. For the purposes of controlling the transmission of fluid through the various ports and passages, the valve member 158 has a central reduced portion 200 flanked at opposite sides respectively by a right-turn motor land 202 and a left-turn motor land 204, these lands being respectively flanked by reservoir grooves 206 and 208. End lands 210 and 212 support the valve member 158 for axial sliding in the valve bore or chamber 156.

When the valve member 158 is in its neutral or central position as shown in Fig. 4, the motor lands 202 and 204 respectively afford slight clearances at both sides thereof as respects the motor grooves 174 and 176. Thus, the motor grooves are in communication with the high-pressure chamber 160 but at the same time are also in communication with the reservoir ports 196 and 198 because of the reservoir reductions 206 and 208. Because of the very nature of the design, the clearances are relatively slight and these have been exaggerated somewhat in the drawings to illustrate them. It must be remembered, however, that it takes a movement in either direction of only a few thousandths of an inch to establish communication with either of the motor ports, which is required to make the hydraulic system immediately and accurately responsive to turning of the steering wheel.

For effecting a right-hand turn, the valve member 158 will be shifted to the rear (to the left as seen in Fig. 4), in which case the right-turn motor land 202 will cut off the reservoir port 196 and the left-turn motor land 204 will fully open the reservoir port 198 to the left-turn motor 180. Fluid under pressure will then be delivered by the pump 166 through the line 164 into the high-pressure chamber 160 and thence through the right-turn motor port 178 and line 182 to the motor 122 at the left-hand side of the fixed vane 126. This will cause clockwise rotation (as viewed in Fig. 3) of the spindle 90 as the front wheels means 14 is steered to the right. A limit on the extent of turning of the spindle 90 to the right is established by engagement of the vane-support casting 140 with the ears 130 on the fixed vane 126.

Shifting of the valve 158 forwardly effects a left turn for the tractor. The extent of angular movement of the spindle 90 in a counterclockwise direction as viewed in Fig. 3 (or to the left) is limited by a stop pin 214 extending between and fixed at its opposite ends respectively to the upper and lower motor walls 74 and 56.

Circulation of the fluid to the reservoir 86 from the reservoir ports or passages 196 is through the worm housing 114 and worm wheel housing 50 and thence to the reservoir 86 because the upper portion of the reservoir is open at 216 to accommodate the ullage rod 148 as previously described. Specifically, the reservoir fluid flows from the ports 196 and 198 through the adjacent side opening 118 in the worm housing 114, across the worm housing and through the registering openings 112 and 116 in the abutting worm wheel and worm housings. As indicated above, the hydraulic fluid also lubricates the steering gear means 104 and, in its movement downwardly to the reservoir 86, appropriate quantities of fluid are trapped in the retaining pocket 152 at the upper end of the spindle 90. Thus, the entire circuit is closed and critical portions thereof are contained with the housing and enclosure structure afforded by the pedestal or tubular support 42 and its component parts. Of importance is the fact that the motor 122 is housed in the tubular structure and the mechanical steering means 104 as well as the control valve 154 are likewise housed in rigid structure and are not therefore subject to defects in operation occurring because of temporary misalinement due to operation of the tractor. Although the fluid lines between the pump and valve, between the valve and motor, and between the reservoir 86 and pump are external to the structure 42, they are compactly arranged and lie alongside of the structure, being additionally enclosed by the radiator grille 22 and thus in a position in which they are substantially wholly free from damage because of minor collisions.

Control mechanism

In general, operation of the control mechanism is based upon the proposition that some control-initiating part must be mobilized in response to torque applied to the steering wheel by the operator; and the resulting movement must be used to translate the intention of the operator mechanically or otherwise to the control valve 122. According to the present invention, both the steering worm 106 and the steering shaft 32 are relatively rotatable but are fixed against axial displacement. Consequently, neither of these parts is used as an axially shiftable member functioning in response to torque reaction. For this reason, the control system according to the present invention is considered to be a material improvement over prior designs, since it is stable, accurate, free from the transmission of road shock and embodying a desirable "feel" to enable the operator to steer with the same skill as but with much less effort than he might use in steering a tractor equipped with conventional mechanical steering means.

The worm housing 114 includes integrally therewith a pair of axially spaced supporting portions 218 and 220 in which are respectively carried antifriction bearings 222 and 224, each preferably of the tapered roller type. These bearings thus fix the worm 106 against axial displacement relative to the support established by the worm housing 114.

The worm 106 includes an integral coaxial shaft extension 226, hereinafter sometimes referred to as a gear shaft because the worm 106 is considered a gear element or the equivalent of gears or comparable parts that will be found in other types of mechanical steering systems. For present purposes, as will be obvious, the particular type of mechanical steering gear is not material, except that, as already stated, the worm 106 and its integral shaft 226 are fixed against axial displacement while being approximately journaled for angular movement or rotation. The worm gear shaft 226 is coaxial with the forward portion of the steering shaft 32 and these shafts respectively have terminal ends 228 and 230 proximate to each other but spaced axially apart.

A sleeve or comparable annular member 232 surrounds and is loose on the shaft 226 and has an external annular groove 234 in which is received a yoke or fork 236 of a valve-operating member 238. The end of the member 238 opposite the fork 236 is suitably and rigidly connected to the valve member 158, as at 240, the object being to eliminate lost motion to as great an extent as possible. As will be seen, axial shifting of the sleeve 232 on the shaft 226 is utilized to effect axial shifting of the valve 158 for the purposes of accomplishing power steering of the steerable front wheel means 14.

The sleeve 232 includes an integral annular extension 242 that projects axially beyond the terminal end 228 of the shaft 226. A coaxial collar 244 is secured to the terminal end 230 of the steering shaft 32 as by means of a pair of diametrically opposed lock screws 246 so that in effect the collar 244 is an integral part of the steering shaft 32. The forward portion of the collar 244 has an external annular flange 248 that runs in an annular groove established by a concentric radial surface 250 on the proximate portion of the worm housing 114 and a complementary radial surface 252 formed on the front part of a rear cap 254 that is secured to the worm housing 114. The interior of the cap 254 provides a bearing 256 for journaling the collar 244 and consequently journals the front portion of the steering shaft 32. The flange 248 and the groove in which it runs thus establish means for holding the steering shaft 32 against axial displacement.

Figure 7:
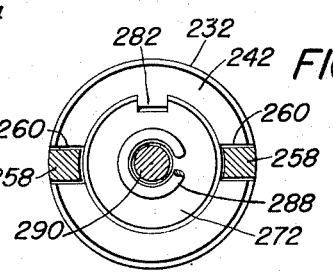
Fig. 7 is an enlarged sectional view, on the same scale as Fig. 6 as seen along the line 7—7 of Fig. 4.

The extreme forward end of the collar 244, ahead of the annular flange 248, includes a pair of axially extending diametrically opposite driving lugs 258 (Fig. 7) which are received in diametrically opposed, axially rearwardly opening pockets or notches 260 in the rear end or extension 242 of the sleeve 232. Thus there is established driving means between the steering shaft 32 and the control sleeve 232 by means of which the two parts just described may turn or rotate in unison. It will be noted, however, that the driving means just referred to is axially separable and therefore enables axial shifting of the sleeve 232 relative to the steering shaft 32.

Axial shifting of the control sleeve 232 in response to turning of the steering shaft 32 is accomplished by drive means between the sleeve 232 and the worm shaft 226. For this purpose, the worm shaft has a partially helical groove 262 therein for establishing an arcuate or spiral track. A follower in the form of a screw 264 is carried by the sleeve and enters the track or groove 262. Consequently, as the steering shaft 32 is turned in one direction or the other, the sleeve 232 is caused to be propelled axially forwardly or rearwardly relative to the fixed worm 106. The status of the worm 106 as fixed is established because of the resistance to turning set up by the engagement of the wheel means 14 with the ground. Therefore, torque imposed on the steering shaft 32 reacts on the worm shaft 226 to cause shifting of the sleeve 232. Specifically, turning of the steering wheel to the right, which would conventionally produce a right-hand turn by means of the mechanical steering gear 104, will similarly produce a right-hand turn by the hydraulic power means. That is to say, if the steering shaft 32 is turned to the right, the follower screw 264 in following the track 262 causes the sleeve 232 to shift rearwardly, resulting in rearward shifting of the valve member 158 to cut in the right-turn motor line 182 and to establish communication between the left-turn motor line 190 and the reservoir 86 via the passage 188, port 180, groove 176, reservoir passage 196 and the open interiors of the housings 114 and 50. Conversely, turning of the steering wheel 32 to the left will cause the sleeve 232 to shift forwardly and will effect a left turn by power. Of course, in either case, as soon as the application of torque to the steering shaft 32 is discontinued and the worm 106 tends to be rotated as a result of steering of the spindle 90 by means of the vane motor 122, the control valve member 158 is returned to neutral, because angular movement of the worm 106 reverses the direction of axial shifting of the sleeve 232 and therefore effects what is conventionally known as a follow-up means. Continued steering may be had by continued application of torque to the steering shaft 32 until the worm ultimately "catches up" with the steering shaft.

It is desirable that means be provided in order to enable the steering mechanism to be mechanically steered in the event that the power system becomes ineffective for some reason or another. For this purpose, there is an additional drive means effective between the sleeve 232 and worm shaft 226 for connecting these two parts for turning in unison, this means including, however, lost-motion provision so that the sleeve 232 may move angularly relative to the shaft 226 in accomplishing its function as part of the hydraulic control system. As best shown in Fig. 6, this drive means comprises a longitudinal keyway 266 in the outer surface of the worm shaft 226 and a cooperating longitudinal key 268 on and internally of the sleeve 232. Provision for lost motion is achieved by making the key 268 thinner or materially smaller in angular dimension than that of the keyway 266, whereby the sleeve 232 may move angularly relative to the worm shaft 226 to a limited extent in either angular direction from the central or neutral position shown in Fig. 6, which will be the position just prior to turning of the steering shaft 32 or immediately after the shaft 32 is turned and the worm shaft "catches up" with the steering shaft.

Since friction between the sleeve 232 and worm shaft 226 and between the groove 262 and follower screw 264 is so small as to be incapable of affording much resistance to turning of the steering wheel 30, it is desirable that some means be included for giving the operator a sense of "feel," the advantages of which have already been outlined. For this purpose, the rear or terminal end 228 of the worm shaft 226 has incorporated therein a cam element 270 which cooperates with a second cam element 272 formed on the front radial face of a cylindrical centering or "feel" member 274. The cam element 270 is in the form of a cam having opposite cam faces or ramps 276 respectively cooperative with internal cam faces or ramps 278 formed on the member 274. As will presently appear, the member 274 is rotatable in unison with the steering shaft 32 and sleeve 232 but is axially shiftable relative to these two parts. The drive means for interconnecting the parts 274, 32 and 232 comprises a longitudinal keyway 280 in the member 274 and a rearward key extension 282 of the sleeve key 268.

The member 274 is centrally apertured at 284 and the terminal end 228 of the worm shaft 226 has an axial tapped bore 286 therein. Biasing means is provided for urging the member 274 forwardly so that the cam elements 270 and 272 are yieldably maintained in engagement. The biasing means takes the form of an elongated coiled compression spring 288 encircling an elongated rod-like element 290 that has it forward end threaded at 292 into the tapped bore 286 in the worm shaft 226. The rear or remote end of the rod-like element 290 carries abutment means in the form of a pin 294 and washer 296 against which the rear end of the spring 288 abuts, the forward end of the spring abutting, of course, against the rear face of the member 274. The forward or front terminal end 230 of the steering shaft 32 is tubular to accommodate the coaxial rod 290 and spring 228.

The diameter of the member 274 is such that it is encircled by or contained within the sleeve extension 242 on the sleeve 232. Furthermore, the front face of the collar 244 is axially recessed at 298 to accommodate rearward movement of the member 274 as the cam elements separate axially upon turning of the steering shaft 32.

Operation by power

Many of the operational characteristics of the power system have been described above in connection with the description of the structure, but a brief resume of the operation may be beneficial.

When the operator desires to make a right-hand turn, he turns the steering wheel 30 and steering shaft 32 to the right, or in the conventional right-turn direction. Since the collar 244 is secured to the front end 230 of the steering shaft 32, it is in effect part of the steering shaft and accordingly turns in unison therewith. The resistance occasioned by contact of the front wheel means 14 with the ground in effect fixes the position of the worm wheel 102 so that the worm becomes a reaction member. When the steering shaft 32 and collar 244 are turned in unison, the collar drives the sleeve 232 in the same direction that the steering shaft is turned, the lug means 258—260 establishing the driving connection. Because of the spiral or partly helical slot 262 in the temporarily fixed worm shaft 226 and the follower 264 in the sleeve 232, rotation of the sleeve 232 by the steering shaft and collar is accompanied by rearward axial shifting of the sleeve 232 relative to the shafts 32 and 226. The nature of the drive means at 258—260 permits the axial shift. Since the key 268 in the sleeve 232 is thinner than the keyway 266 in the worm shaft 226, the worm shaft offers no obstacle to slight angular movement of the sleeve 232.

As the sleeve 232 moves rearwardly, it carries with it the valve-operating member 238 and accordingly the valve member 158, whereupon the land 204 on the valve member communicates the motor port 180 with the reservoir passage 198 and the land 202 on the valve member 158 disconnects the right-turn motor port 178 from the reservoir passage 196 and opens that right-hand motor port to full fluid pressure from the pump via the line 164, inlet 162 and high-pressure chamber 160. Fluid will thereupon be delivered under pressure to the motor 122 via the line 182 and motor inlet 184, forcing the vane 124 in a clockwise direction as viewed in Fig. 3. The worm 106 is caused to follow the turning spindle 90 by the action of the centering cam elements 270 and 272, where the worm itself is irreversible as respects the transmission of movement thereto by the worm wheel 102; although there is in any event a tendency for the worm to follow the worm wheel when the latter turns with power-operated steering by the vane motor, in which case the centering cam elements at least assist this tendency of the worm to follow the worm wheel. Hence, when the operator ceases turning of the steering wheel 30, the worm shaft 226 is able to "catch up" with the steering shaft 32, whereupon the sleeve 232 is moved back to its starting position and the valve member 158 is restored to its neutral position.

Turning of the steering shaft 32 to the left gives a result just the converse of that described. That is to say, the sleeve 232 is shifted forwardly to shift the valve member 158 forwardly, cutting off the left-turn motor port 180 from the reservoir passage 198 and connecting the right-turn motor port 178 to the reservoir passage 196. Fluid under pressure will then be delivered via the line 190 to the motor 122 at the right-hand side of the fixed vane 126 and will cause the vane 124 to move in a counterclockwise direction, as viewed in Fig. 3, carrying the spindle 90 with it. As before, the follow-up characteristic will be present and the valve will be returned to neutral as soon as the operator ceases turning the steering wheel 32.

In either case, the "feel" or "centering" means 270—272 will afford the operator the necessary feel so that he is able to accurately sense steering of the tractor by power. When the wheel 30 and steering shaft 32 are turned in either direction, there follows an axial spreading of the elements 270 and 272, resisted by the biasing means or spring 288 as the ramps 276 and 278 ride up each other. As the worm rotates to produce the follow-up action, it is assisted by the tendency of the elements 270 and 272 to center; hence, these elements may be referred to as self-centering cam means. The result is the same, as already stated, regardless of the direction of rotation of the steering shaft 32.

Operation mechanically

In the event that the power system fails or is idled for some other reason, the steerable front wheel means 14 may still be steered mechanically through the steering gear 104; although, there will be some lost motion because of the difference in angular dimensions of the key 268 and keyway 266. Nevertheless, the slight lost motion is immaterial in what may be termed an emergency steering provision. As the sleeve 232 is rotated in unison with the steering shaft 32, because of the collar 244 and drive means 258—260, the key 268 shortly picks up the lost motion and engages the proximate side of the keyway 266 and renders effective a positive drive connection between the sleeve and the worm shaft 226. The emergency provision operates in either direction.

Summary

The compact organization and adaptation of the power steering design to a tractor of generally conventional construction is an important feature of the design. A steering pedestal (the tubular support 42 and its components) has been utilized and accomplishes the several functions of supporting the spindle 90, housing the motor 122, providing a fluid reservoir 86, enclosing the steering gear 104 and supporting the valve housing 120 for the valve 154. The external fluid lines are compactly organized in proximity to the tubular support 42 and all are concealed behind the radiator grille 22. The stacked or sandwich construction of the tubular support 42 facilitates manufacture, disassembly, repair and reassembly.

The improved control system accurately regulates the power system and the means 270—272 affords the operator the necessary feel so that he is at all times in command of the power system. In the event of failure, the system may be operated mechanically without any adverse effect on the power system.

Various other features of the invention, not specifically enumerated herein, will undoubtedly occur to those versed in the art, as likewise will numerous modifications and alterations in the preferred embodiment of the invention illustrated, all of which may be achieved without departing from the spirit and scope of the invention.

What is claimed is:

1. Steering control mechanism, comprising: steering gear means including a rotatable gear shaft fixed against axial movement and having a terminal end and an external longitudinal keyway; a sleeve loose on, and having an annular end portion projecting axially beyond the terminal end of, the gear shaft; an internal key on the sleeve substantially thinner than and received in the keyway in the gear shaft and providing for both axial and limited angular movement of the sleeve relative to the gear shaft; a rotatable collar coaxial with the sleeve and having an end portion proximate to the sleeve end portion; axially separable, angularly engageable lug means on the proximate end portions of the collar and sleeve and interconnecting the collar and sleeve for rotation in unison while permitting axial movement of the sleeve relative to the collar; a rotatable steering shaft fixed against axial movement and having a tubular end portion coaxially received within and secured to the collar for rotation with the collar; a centering member coaxially intermediate the terminal end of the gear shaft and the end portion of the collar and encircled by the projecting annular end portion of the sleeve; key means connecting the centering member to the sleeve for immediate rotation with but for axial movement relative to the sleeve; biasing means contained at least in part in the tubular end portion of the steering shaft and acting on the centering member to urge said member toward the terminal end of the gear shaft; cam means including cooperative cam portions respectively on the centering member and the terminal end of the gear shaft and effective to displace the member axially away from the gear shaft and against the biasing means upon rotation of the member by the sleeve when the sleeve has limited angular movement in one direction relative to the gear shaft, said cam portions being further so arranged as to tend to center the sleeve and gear shaft angularly under action of the biasing means; means cooperative between the sleeve and gear shaft for causing the sleeve to move axially relative to the gear shaft upon turning of the sleeve by the collar via turning the steering shaft; and operating means connected to the sleeve and movable in response to axial movement of the sleeve.

2. The invention defined in claim 1, in which: the key means connecting the centering member to the sleeve comprises a keyway in the centering member alined with the keyway in the gear shaft, and the internal key on the sleeve has a longitudinal extension entering the centering member keyway, said centering member keyway being materially narrower than the sleeve keyway and fitting the key extension relatively tightly so as to preclude angular lost motion between the sleeve and centering member.

3. The invention defined in claim 1, in which: the centering member has an axial aperture; a rod-like element is anchored at one end to the terminal end of the gear shaft and extends axially therefrom through the centering member aperture and into the tubular portion of the steering shaft to an end portion remote from the gear shaft; and the biasing means is a coiled spring encircling the element and confined between the centering member and the remote end portion of said element.

4. Steering control mechanism for a power steering system including a neutrally positioned operating member movable to and from an active position to selectively energize and neutralize the system, comprising: first and second coaxial and relatively rotatable shafts fixed against relative axial displacement and having proximate terminal ends spaced apart axially; a sleeve loosely carried on the first shaft in a neutral position and axially shiftable relative to the shafts to and from an active position; first drive means positively connecting the sleeve to the second shaft for turning of the sleeve and second shaft in unison relative to the first shaft and enabling axial shifting of the sleeve relative to both shafts; second drive means connecting the sleeve to the first shaft for causing axial shifting of the sleeve relative to the shafts to its active position in response to turning of the sleeve and second shaft in unison relative to the first shaft; means connecting the operating member to the sleeve for simultaneous movement of the two in unison in response to axial shifting of the sleeve to its active position for energizing the power system; first and second self-centering cam elements in addition to the second drive means and positioned in the space between the terminal ends of the shafts and normally occupying a self-centered relationship when the shafts are stationary as respects relative angular movement thereof, said elements being arranged for relative rotation and for relative axial separation out of said normally self-centered relationship incident to such rotation of the second shaft relative to the first shaft; means fixing the first cam element to the first shaft; means connecting the second cam element to the second shaft for movement thereof angularly with and axially relative to said second shaft; and biasing means resisting said axial separation of and tending to self-center the cam elements for causing the first shaft to rotate in following relation to the second shaft.

5. The invention defined in claim 4, including: third drive means, including provision for lost motion in opposite angular directions, for mechanically interconnecting the shafts for rotation in unison following preliminary relative rotation of the shafts.

6. The invention defined in claim 4, in which: one of the shafts has a hollow portion opening axially at its terminal end, and the biasing means is housed at least in part in said hollow portion.

7. The invention defined in claim 4, in which: the sleeve has an axially projecting annular portion encircling the space between the terminal ends of the shafts and surrounding the cam elements.

8. The invention defined in claim 4, in which: the first cam element presents a generally radial cam face as respects the axis of the shafts; the second cam element is a coaxial member having a generally radial cam face complementing the first cam face, said member having an axial bore therethrough; a rod-like element is joined to the terminal end of the first shaft and projects axially loosely through the bore in the member to an end portion axially beyond said member; the biasing means is a coiled spring encircling the rod-like element and acting on the member and reacting on said remote end portion; and the second shaft is hollow to accommodate the rod-like element and biasing means.

9. Steering control mechanism for a power steering system including a neutrally positioned operating member movable to and from an active position to selectively energize and neutralize the system, comprising: first and second coaxial and relatively rotatable shafts fixed against relative axial displacement and having proximate terminal ends spaced apart axially; a normally neutrally positioned sleeve encircling the first shaft; means connecting the sleeve and first longitudinal keyway in the first shaft and a cooperative key on the sleeve, said key being of materially smaller angular dimension than the keyway so that the sleeve has limited angular movement relative to the first shaft as well as relative axial movement; drive means connecting the sleeve and second shaft for turning in unison relative to the first shaft to the extent permitted by the aforesaid key and keyway, said drive means including provision for axial shifting of the sleeve relative to the shafts to and from an active position; second drive means connecting the sleeve and first shaft for causing axial shifting of the sleeve relative to the shafts in response to turning of the sleeve and second shaft in unison relative to the first shaft; means connecting the operating member to the sleeve for movement of said member to its active position in response to axial shifting of the sleeve to its active position; first and second self-centering cam elements positioned in the space between the terminal ends of the shafts and normally occupying a self-centered relationship when the shafts are stationary as respects relative angular movement thereof, said elements being arranged for relative rotation and for relative axial separation out of said normally self-centered relationship incident to such rotation of the second shaft relative to the first shaft; means fixing the first cam element to the first shaft; means including an extension on the aforesaid key connecting the second cam element to the sleeve for movement thereof angularly with and axially relative to the sleeve; and biasing means resisting said axial separation of and tending to self-center the cam elements for causing the first shaft to rotate in following relation to the second shaft.

10. Steering control mechanism for a power steering system including a neutrally positioned operating member movable to and from an active position to selectively energize and neutralize the system, comprising: first and second coaxial and relatively rotatable shafts fixed against relative axial displacement and having proximate terminal ends spaced apart axially; normally neutrally positioned sleeve loose on the first shaft for axial and angular movement relative to said first shaft to and from an active position spaced axially from the neutral position thereof and having an end portion proximate to the terminal end of said first shaft; a coaxial collar fixed to the second shaft for rotation therewith and having an end portion proximate to the sleeve end portion; cooperative angularly engageable and axially separable lug means on said proximate end portions for interconnecting the sleeve and collar for rotation in unison while permitting axial shifting of the sleeve relative to the collar and shafts; drive means connecting the sleeve to the first shaft for causing axial shifting of the sleeve in response to unitary rotation of the second shaft collar and sleeve relative to the first shaft; means connecting the operating member to the sleeve for movement of said member to its active position in response to axial shifting of the sleeve to its active position; first and second self-centering cam elements in addition to the second drive means and positioned in the space between the terminal ends of the shafts and normally occupying a self-centered relationship when the shafts are stationary as respects relative angular movement thereof, said elements being arranged for relative rotation and for relative axial separation out of said normally self-centered relationship incident to such rotation of the second shaft relative to the first shaft; means fixing the first cam element to the first shaft; means connecting the second cam element to the second shaft for movement thereof angularly with and axially relative to said second shaft; and biasing means resisting said axial separation of and tending to self-center the cam elements for causing the first shaft to rotate in following relation to the second shaft.

11. The invention defined in claim 9, in which: the biasing means is encircled at least in part by the collar.

12. Steering control mechanism, comprising: support means; steering actuator means on the support means; first shaft means journaled on and fixed against axial displacement relative to the support means, said shaft means including a journaling portion having a terminal end and an external axially directed keyway; second shaft means coaxial with the first shaft means and including a sleeve extension rotatable with said second shaft means and carried on the first shaft means journaling portion for movement both axially and angularly relative to said first shaft means, said second shaft means being tubular in proximity to the terminal end of the first shaft means journaling portion to afford an axial pocket opening to said journaling portion; drive means cooperative between the sleeve extension and the first shaft means for effecting angular and axial movement of the sleeve extension on the journaling portion in response to turning of the second shaft means; internal key means on the sleeve extension received by but narrower than the first shaft means keyway to enable limited angular movement of the sleeve extension relative to the first shaft means; means connecting the sleeve extension and the steering actuator means for operating said steering actuator means in response to axial shifting of said sleeve extension; first and second self-centering cam elements positioned in the aforesaid pocket and arranged for relative rotation and for relative axial separation from and return to each other; means fixing the first cam element to the terminal end of the journaling portion of the first shaft means; means connecting the second cam element to the second shaft means within said pocket for movement of said second cam element angularly with and axially relative to said second shaft means; and biasing means in said pocket and acting on the second cam element for resisting axial separation of said elements.

13. The invention defined in claim 12, in which: the means connecting the second cam element and the second shaft means includes a keyway in the second cam element alined with the keyway in the first shaft means journaling portion, and an extension on the aforesaid key projecting into and fitting said cam element keyway.

14. Steering control mechanism, comprising: support means; steering actuator means on the support means; first shaft means journaled on and fixed against axial displacement relative to the support means, said shaft means including a journaling portion having a terminal end; second shaft means coaxial with the first shaft means and including a sleeve extension rotatable with said second shaft means and carried on the first shaft means journaling portion for movement both axially and angularly relative to said first shaft means, said second shaft means being tubular in proximity to the terminal end of the first shaft means journaling portion to afford an axial pocket opening to said journaling portion; drive means cooperative between the sleeve extension and the first shaft means for effecting angular and axial movement of the sleeve extension on the journaling portion in response to turning of the second shaft means; means connecting the sleeve extension and the steering actuator means for operating said steering actuator means in response to axial shifting of said sleeve extension; first and second self-centering cam elements positioned in the pocket and arranged for relative rotation and for relative axial separation from and return to each other; means fixing the first cam element to the terminal end of the journaling portion of the first shaft means; means connecting the second cam element to the second shaft means within said pocket for movement of said second cam element angularly with and axially relative to said second shaft means; and biasing means in said pocket and acting on the second cam element for resisting axial separation of said elements.

References Cited in the file of this patent

UNITED STATES PATENTS

| | | |
|---|---|---|
| 1,389,620 | Boswell | Sept. 6, 1921 |
| 1,565,754 | Orth | Dec. 15, 1925 |
| 1,857,897 | Vincent | May 10, 1932 |
| 2,144,769 | Melmer | Jan. 24, 1939 |
| 2,347,364 | Palumbo | Apr. 25, 1944 |
| 2,679,165 | Montgomery | May 25, 1954 |